(12) United States Patent
Lechtenboehmer et al.

(10) Patent No.: US 7,514,494 B2
(45) Date of Patent: Apr. 7, 2009

(54) PNEUMATIC TIRE CONTAINING A SILICA PRETREATED WITH A FLUORINATED SILANE

(75) Inventors: Annette Lechtenboehmer, Ettelbruck (LU); Frank Schmitz, Bissen (LU); Giorgio Agostini, Colmar-Berg (LU); Marc Weydert, Strassen (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 11/411,371

(22) Filed: Apr. 26, 2006

(65) Prior Publication Data

US 2007/0254993 A1 Nov. 1, 2007

(51) Int. Cl.
B29C 73/16 (2006.01)
C08K 5/02 (2006.01)

(52) U.S. Cl. ........................ 524/462; 524/492
(58) Field of Classification Search ................ 524/462, 524/492, 493
See application file for complete search history.

(56) References Cited

U.S. PATENT DOCUMENTS

| 4,474,908 | A | 10/1984 | Wagner | 523/213 |
|---|---|---|---|---|
| 5,708,053 | A | 1/1998 | Jalics et al. | 523/200 |
| 6,035,911 | A | 3/2000 | Matsumoto et al. | 152/209.5 |
| 6,407,153 | B1 | 6/2002 | von Hellens | 524/188 |
| 6,441,070 | B1 | 8/2002 | Halasa et al. | 524/128 |
| 6,448,325 | B2 | 9/2002 | Visel et al. | 524/492 |
| 6,455,613 | B1 | 9/2002 | Zimmer et al. | 523/213 |
| 6,465,670 | B2 | 10/2002 | Thise et al. | 556/400 |
| 6,506,829 | B1 * | 1/2003 | Materne et al. | 524/493 |
| 6,573,324 | B1 | 6/2003 | Cohen et al. | 524/492 |
| 6,713,549 | B1 | 3/2004 | Wideman et al. | 524/492 |
| 6,953,071 | B2 | 10/2005 | Boes et al. | 152/209.5 |
| 6,994,137 | B2 | 2/2006 | Sandstrom | 152/525 |
| 2002/0128369 | A1 * | 9/2002 | Wideman et al. | 524/493 |
| 2004/0198876 | A1 | 10/2004 | Shiraishi et al. | 524/110 |
| 2004/0265718 | A1 * | 12/2004 | Nakamura et al. | 430/108.4 |
| 2005/0061418 | A1 * | 3/2005 | Bates et al. | 152/564 |
| 2005/0277717 | A1 * | 12/2005 | Joshi et al. | 524/261 |

FOREIGN PATENT DOCUMENTS

EP 1316580 6/2003
WO WO 03/016385 A1 * 2/2003

* cited by examiner

Primary Examiner—Katarzyna Wyrozebski
Assistant Examiner—Angela C Scott
(74) Attorney, Agent, or Firm—John D. DeLong

(57) ABSTRACT

A pneumatic tire including at least one component having a rubber composition including at least one diene based elastomer and a silica that prior to mixing with said elastomer is prehydrophobated with a fluorinated silane of the following formula:

$$R_f\text{—}R^1\text{—}SiX_{3-x}\text{—}R^2_x \quad\quad I$$

wherein $R_f$ is a perfluorinated group optionally containing one or more heteroatoms; $R^1$ is a divalent alkylene group, arylene group or mixture thereof, substituted with one or more heteroatoms or functional groups, containing about 1 to about 16 carbon atoms; $R^2$ is a lower alkyl group; X is a halide, a lower alkoxy group or an acyloxy group; and x is 0 or 1.

14 Claims, No Drawings

PNEUMATIC TIRE CONTAINING A SILICA PRETREATED WITH A FLUORINATED SILANE

BACKGROUND OF THE INVENTION

Pneumatic tires in use typically collect mud and dirt on the sidewall, as well as the lettering on the tire. This results in an unsightly tire. The purpose of the present invention is to reduce the amount of dirt which adheres to the sidewall and lettering by including in a rubber compound a pretreated a silica with a fluorinated silane. The presence of the silica pretreated with a fluorinated silane provides an automatic cleaning effect decreasing the need for scrubbing the sidewall.

Pneumatic tires also collect water in the tread grooves. The purpose of the present invention is also to reduce the adhesion of water and mud inside the grooves, through the presence of the silica pretreated with fluorinated silane in the rubber tread compound, thus obtaining a better evacuation of water as well as a self-cleaning effect.

A clean and dry tire also reduces the weight of the tires as well as the air resistance, thus reducing the fuel consumption. Efforts to reduce air resistance of objects in motion in order to achieve a reduction in fuel consumption have been disclosed for surfaces such as the metallic surface of an airplane.

Against this background, it is an object of the present invention to provide rubber tires that have an improved dirt-repellence whereby the weight of the tire and, consequently the air resistance, are reduced and savings in fuel consumption are obtained.

It is another object of the invention to provide tires having a self-cleaning effect and permitting a reduction of cleaning material to be used.

SUMMARY OF THE INVENTION

The present invention relates to a pneumatic tire comprising at least one component comprising a rubber composition comprising at least one diene based elastomer and a silica that prior to mixing with said elastomer is prehydrophobated with a fluorinated silane of the following formula:

$$R_f\text{—}R^1\text{—}SiX_{3-x}\text{—}R^2_x \qquad \text{I}$$

wherein $R_f$ is a perfluorinated group optionally containing one or more heteroatoms; $R^1$ is a divalent alkylene group, arylene group or mixture thereof, substituted with one or more heteroatoms or functional groups, containing about 1 to about 16 carbon atoms; $R^2$ is a lower alkyl group; X is a halide, a lower alkoxy group or an acyloxy group; and x is 0 or 1.

DETAILED DESCRIPTION OF THE INVENTION

There is disclosed a pneumatic tire comprising at least one component comprising a rubber composition comprising at least one diene based elastomer and a silica that prior to mixing with said elastomer is prehydrophobated with a fluorinated silane of the following formula:

$$R_f\text{—}R^1\text{—}SiX_{3-x}\text{—}R^2_x \qquad \text{I}$$

wherein $R_f$ is a perfluorinated group optionally containing one or more heteroatoms; $R^1$ is a divalent alkylene group, arylene group or mixture thereof, substituted with one or more heteroatoms or functional groups, containing about 1 to about 16 carbon atoms; $R^2$ is a lower alkyl group; X is a halide, a lower alkoxy group or an acyloxy group; and x is 0 or 1.

The pneumatic tire of the present invention contains a silica that is prehydrophobated with a fluorinated silane. The amount of this prehydrophobated silica may vary. Generally speaking, the level ranges from 1 to 150 phr. Preferably, the level of prehydrophobated silica ranges from 10 to 80 phr.

As stated above, silica may be prehydrophobated with a fluorinated silane. Preferably, the fluorinated silane includes an organic moiety with heteroatoms or functional groups. More preferably, the fluorinated silane is of the following formula I:

$$R_f\text{—}R^1\text{—}SiX_{3-x}\text{—}R^2_x \qquad \text{I}$$

wherein $R_f$ is a perfluorinated group optionally containing one or more heteroatoms (typically oxygen atoms); the connecting group $R^1$ is a divalent alkylene group, arylene group or mixture thereof, substituted with one or more heteroatoms (e.g. oxygen, nitrogen or sulfur) or functional groups (e.g. carbonyl, amido or sulfonamido), containing about 1 to about 16 carbon atoms (preferably about 3 to about 10 carbon atoms); $R^2$ is a lower alkyl group (i.e. a ($C_1$-$C_4$) alkyl group, preferably a methyl group); X is a halide, a lower alkoxy group (i.e. a ($C_1$-$C_4$) alkoxy group, preferably a methoxy or ethoxy group) or an acyloxy group (i.e. OC(O)$R^3$ wherein $R^3$ is a ($C_1$-$C_4$) alkyl group); and x is 0 or 1. Preferably, x=0 and if the X groups include alkoxy groups, at least one acyloxy or halide group is present. More preferably, X is a halide or an acyloxy. Even more preferably, each X is a halide, and most preferably, each X is chloride.

The perfluorinated group ($R_f$) can include linear, branched, or cyclic structures, that may be saturated or unsaturated. It is preferably a perfluoroalkyl group ($C_nF_{2n+1}$) wherein n is about 4 to about 20, more preferably, about 6 to about 12, and most preferably, about 7 to about 10. The divalent $R^1$ group can include linear, branched, or cyclic structures, that may be saturated or unsaturated. Preferably, the divalent $R^1$ group is a linear group containing heteroatoms or functional groups. Typically, suitable fluorinated silanes include a mixture of isomers (e.g., a mixture of compounds containing linear and branched perfluoroalkyl groups). Mixtures of fluorinated silanes exhibiting different values of n can also be used.

Examples of preferred fluorinated silanes include, but are not limited to, the following: $C_7F_{15}CH_2OCH_2CH_2CH_2SiCl_3$; $C_7F_{15}CH_2OCH_2CH_2CH_2Si(CH_3)Cl_2$; $C_7F_{15}CH_2OCH_2CH_2CH_2SiCl(OCH_3)_2$; $C_7F_{15}CH_2OCH_2CH_2CH_2SiCl_2(OC_2H_5)$; $C_8F_{17}SO_2N(Et)CH_2CH_2CH_2SiCl_3$; $C_8F_{17}SO_2N(Me)CH_2CH_2CH_2Si(CH_3)Cl_2$; and $C_7F_{15}CH_2OCH_2CH_2CH_2Si(OAc)_3$. Although similar compounds containing three alkoxy groups (e.g., —OCH$_3$) on the silicon atom can be used, they are less desirable because they require a subsequent heat treatment step for effective characteristics. Mixtures of such compounds can be used if desired.

In one aspect of this invention, the silica, particularly precipitated silica aggregates, may be reacted with, particularly pre-reacted with a fluorinated silane, which might be considered herein as a hydrophobating agent for the silica, to hydrophobate, particularly to prehydrophobate, the silica. In one aspect, it is contemplated herein that the silica may be prehydrophobated, for example, by treating silica in an aqueous colloidal form thereof with a fluorinated silane.

It is contemplated that the prehydrophobation of the silica may be accomplished by treating the precipitated silica in a recovered state or by treating colloidal precipitated silica prior to recovery of the precipitated silica.

For example precipitated silica aggregates might be recovered, for example, from colloidal silica, for example by treating a silica hydrosol, and with the aid of acid addition to the treated colloidal silica (for example, sulfuric acid or hydrochloric acid) followed by water washing and drying the recovered hydrophobated silica as a hydrophobated silica gel or as a hydrophobated precipitated silica. While this invention is not intended to be directed to a specific preparation technique (preparation of silica hydrosols, recovery of silica gels and precipitated silicas, etc.) of the pre-hydrophobated precipitated silica itself, for education purposes in this regard, reference might be made to the aforesaid Condensed Chemical Dictionary and U.S. Pat. No. 5,094,829 as well as U.S. Pat. Nos. 5,708,069, 5,789,514 and 5,750,610 for a more detailed discussion.

In one embodiment, prehydrophobation of the silica with fluorinated silane may occur during the synthesis of the precipitated silicate. Process steps are well known to those skilled in the art. For example, the acidifying agent and silicate are well known. Representative examples of acidifying agents are inorganic acids such as sulfuric, nitric, phosphoric and hydrochloric acids and the organic acids such as acetic, formic and carbonic acids.

The silicate may be any common form, such as the metasilicates, disilicates, and advantageously, an alkali metal silicate particularly sodium or potassium silicate. When sodium silicate is used, it typically has an $SiO_2/Na_2O$ weight ratio of from 2 to 4:1, and more particularly, from 3.0 to 3.7:1.

The silicate and electrolyte are combined. The amount of silicate present may be either the total amount required for the reaction or only a portion of that amount.

As regards the "electrolyte", this term is used in its normal sense, i.e., any ionic or molecular species which decomposes or dissociates when in solution, to form ions or charged particles. Salts selected from among the alkali metal and alkaline earth metal salts are particularly exemplary electrolytes, preferably the salt of the starting material silicate and the acidifying agent, for example sodium sulfate in the case of a reaction between a sodium silicate and sulfuric acid. The concentration of electrolyte in the step may vary but is generally less than 17 g/l. Preferably, the concentration of electrolytes is less than 14 g/l.

The concentration of silicate in the step is generally less than 100 g $SiO_2$ per liter. This concentration is preferably less than 80 g/l and more preferably less than 70 g/l. When high concentrations of the acid is used for the neutralization, i.e. over 70 percent, it is preferred to conduct the reaction using an initial silicate sediment in which the concentration of $SiO_2$ is less than 80 g/l.

The next step in the precipitation involves introducing an acidifying agent into the reaction having the composition described above. The addition of this agent, which results in a correlated lowering of the pH of the reaction medium, is continued until a pH of at least about 7, generally from 7 to 8, is attained. Once this value is attained and in the event of a reaction comprising only a portion of the total amount of silicate required, it is advantageous to introduce the additional acidifying agent and the remainder of the silicate simultaneously. The precipitation reaction proper is complete when all of the remaining silicate has been added.

The reaction medium is allowed to age or mature after the precipitation is complete. The aging step may vary, but is generally from 5 minutes to 1 hour.

Nonetheless, in all instances (namely, whether the reaction contains the total amount of silicate required or only a portion thereof), an additional amount of acidifying agent may be added to the reaction medium after precipitation, optionally in a later stage. The acid agent is generally added until a pH of from 3 to 6.5, and preferably from 4 to 6.5, is attained.

The temperature of the reaction medium typically ranges from 70° C. to 98° C. The reaction may be carried out at a constant temperature ranging from 80° C. to 95° C. The temperature at the end of the reaction may be higher than at the beginning. Thus the temperature at the beginning of the reaction may be maintained at from 70° C. to 95° C.; it is then increased over a few minutes, preferably to 80° C. to 98° C. and maintained at that level to the end of the reaction.

It is at this stage, the silane and organic solvent are introduced to the reaction. The above reaction is generally conducted in a non-glass reaction vessel. Preferably, the reaction vessel is made of polyethylene and the reaction may be conducted neat or in the presence of a suitable solvent. If a solvent is used, the primary criterion is to use a solvent, which does not react with the starting materials or end product. Representative organic solvents include chloroform, dichloromethane, carbon tetrachloride, hexane, heptane, cyclohexane, xylene, benzene, toluene, aliphatic and cycloaliphatic alcohols. Preferably, water is avoided to prevent reaction with the siloxy groups of the compounds.

By varying the weight ratio of the silane to silica and the surface area of the resulting silica, one can control the resultant product. Generally speaking, the weight ratio of the silane to silica ranges from 2:1000 to 1:10. Preferably, the weight ratio ranges from 20:1000 to 50:1000.

The reaction between the silica and the silane of formula I is conducted in a two phase aqueous/organic system. The aqueous/organic system assists in the phase separation upon completion of the reaction. The silane compound of formula I is generally predissolved in the organic phase prior to addition to the reaction mixture containing the aqueous phase of silica particles. Representative examples of organic solvents include toluene, xylene, benzene, hexane, heptane, octane, decane, chlorobenzene and the like.

In accordance with the preferred embodiment of the present invention, the precipitated silica particulates are suspended or dispersed in the aqueous phase under continuous stirring. A solvent such as hexane is then added containing the silane compound of formula I. The mixture is then heated, optionally under an inert atmosphere. The mixture may be heated to a temperature ranging from about 60 to 100° C., with a temperature of from 75 to 95° C. being preferred. The progress of the reaction may then be followed by G.C. or other analytical techniques. Upon filtration, the desired product is separated. Depending on the degree of concentration of the silane or the silica, one will isolate the product in the aqueous or organic phase. At lower concentrations, the modified silica will be located in the aqueous phase. At higher concentrations, the modified silica will be located in the organic phase.

A liquid/liquid separator may be used to separate the two phases.

In the instance when the organic phase contains the modified silica, the product may be isolated or recovered by distilling the solvent or flash stripping the solvent.

If the modified silica is located in the aqueous phase, such separation typically comprises a filtration, if necessary, followed by washing. The filtration may be effected by any suitable techniques, for example via a filter press or band filter, or centrifuge or rotating filter under vacuum.

It is known that if one desires to subsequently spray dry the product, the proportion of dry solids in the suspension immediately before it is dried must be no greater than 24 percent, but greater than 13 percent, by weight.

The suspension of silane treated silica thus recovered (filter cake) is then dried.

The drying step may be effected by any of the conventional techniques known to those skilled in the art. The preferred technique is spray drying. Any appropriate type of spray may be used for this purpose, especially turbine, nozzle, liquid pressure diffuses or dual fluid sprays.

The silica modified precipitated silica is in the form of substantially spherical beads, preferably having an average particle size of at least 80 microns and with a mean particle size of from 5 to 70 microns.

The dried silane modified silica of low concentration may be subjected to an agglomeration stage. The term "agglomeration" is intended to include any technique for bonding divided materials to convert them into larger, mechanically strong particles. Such techniques typically include dry compacting, direct compression, wet granulation (i.e. using a binder such as water, silica slurry or the like) and extrusion. The apparatus used to carry out such techniques is well known to this art and includes, for example, compacting presses, pelleting machines, rotating drum compacting machines, rotating granulators and extruders. The dry compacting technique is preferred, and in particular, a drum-type compacting machine where the compacting is effected by conveying powdered product between two rolls which are under pressure and rotating in reverse directions. The pressure exerted may range from 15 to 50 bars. When this technique is used, it is advantageous to deaerate the powdered products prior to the compacting stage, such as to remove the air included therein. (This operation is also described as pre-densification or degassing.) The deaeration may be carried out in apparatus which is per se well known to the art, by transferring the powders between porous elements (plates or drums) equipped with a vacuum suction system.

The dried silane modified silica of high concentration (found in organic phase) may be agglomerated in a different manner. In this case, an oil, polymer or wax may be added and then an extruder or granulation may be used to compact the product. In accordance with another embodiment, a polymer cement may be used at this stage to form a silica-polymer masterbatch.

Upon completion of the agglomeration stage, the silane treated silica may be calibrated to a desired predetermined size, for example, by screening, and then packaged for use.

The weight percent of the silane on the silica may vary. For example, the amount of silane on the silica may range from 0.2 percent by weight to 10 percent by weight of the total weight of the modified silica. Preferably, the level ranges from 2 percent to 5 percent by weight.

The level of prehydrophobated silica which may be added to the rubber may range from 1 to 200 parts by weight per 100 parts by weight of rubber (phr). Preferably, the level of surface modified silica may range from 10 to 110 phr.

The present invention may be used with rubbers or elastomers containing olefinic unsaturation. The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition", "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene(polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are polybutadiene and SBR.

In one aspect the rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

The relatively high styrene content of about 30 to about 45 for the E-SBR can be considered beneficial for a purpose of enhancing traction, or skid resistance, of the tire tread. The presence of the E-SBR itself is considered beneficial for a purpose of enhancing processability of the uncured elastomer composition mixture, especially in comparison to a utilization of a solution polymerization prepared SBR (S—SBR).

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S—SBR) typically has a bound styrene content in a range of about 5 to about 50, preferably about 9 to about 36, percent. The S—SBR can be conveniently prepared, for example, by organo lithium catalyzation in the presence of an organic hydrocarbon solvent.

A purpose of using S—SBR is for improved tire rolling resistance as a result of lower hysteresis when it is used in a tire tread composition.

The rubber composition may optionally include from 0 to about 20 phr of 3,4-polyisoprene rubber. The 3,4-polyisoprene rubber (3,4-PI) is considered beneficial for a purpose of enhancing the tire's traction when it is used in a tire tread composition. The 3,4-PI and use thereof is more fully described in U.S. Pat. No. 5,087,668 which is incorporated herein by reference. The Tg refers to the glass transition temperature which can conveniently be determined by a differential scanning calorimeter at a heating rate of 10° C. per minute.

The cis 1,4-polybutadiene rubber (BR) is considered to be beneficial for a purpose of enhancing the tire tread's wear, or treadwear. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

The term "phr" as used herein, and according to conventional practice, refers to "parts by weight of a respective material per 100 parts by weight of rubber, or elastomer."

The rubber composition may also include from 30 to 70 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, napthenic, vegetable oils, and low PCA oils, such as MES, TDAE, SRAE and heavy naphthenic oils.

In one embodiment, the rubber composition includes a low PCA oil. Suitable low PCA oils include but are not limited to mild extraction solvates (MES), treated distillate aromatic extracts (TDAE), and heavy napthenic oils as are known in the art; see for example U.S. Pat. Nos. 5,504,135; 6,103,808; 6,399,697; 6,410,816; 6,248,929; 6,146,520; U.S. Published Applications 2001/00023307; 2002/0000280; 2002/0045697; 2001/0007049; EP0839891; JP2002097369; ES2122917. Generally, suitable low PCA oils include those having a glass transition temperature Tg in a range of from about −40° C. to about −80° C. MES oils generally have a Tg in a range of from about −57° C. to about −63° C. TDAE oils generally have a Tg in a range of from about −44° C. to about −50° C. Heavy napthenic oils generally have a Tg in a range of from about −42° C. to about −48° C.

Suitable low PCA oils include those having a polycyclic aromatic content of less than 3 percent by weight as determined by the IP346 method. Procedures for the IP346 method may be found in *Standard Methods for Analysis & Testing of Petroleum and Related Products* and *British Standard* 2000 *Parts,* 2003, 62nd edition, published by the Institute of Petroleum, United Kingdom.

In one embodiment, the low PCA oils may be an MES, TDAE or heavy napthenic types having characteristics as identified in the following table.

| | MES | TDAE | Heavy Naphthenic |
|---|---|---|---|
| Aromatics % (2140) | 11-17 | 25-30 | 11-17 |
| Spec. Gravity @ 15° C. [kg/l] | 0.895-0.925 | 0.930-0.960 | 0.920-0.950 |
| Visc. 40° C. (cSt) | 150-230 | 370-430 | 350-820 |
| Visc. 100° C. (cSt) | 13-17 | 16-22 | 17-33 |
| Visc. Gravity Const. | 0.825-0.865 | 0.860-0.890 | 0.840-0.870 |
| Refractive Index | 1.495-1.510 | 1.520-1.540 | 1.500-1.520 |
| Tg [° C.]/inflection | −60 ± 3 | −47 ± 3 | −45 ± 3 |
| Aniline Point [° C.] | 85-100 | | |
| Pour Point [° C.] | 0 max | 30 max | 0 max |
| DMSO [%, IP 346] | <2.9 | <2.9 | <2.9 |
| Flashpoint [° C.] | >220 | >240 | >240 |

In one embodiment, the low PCA oils may be an MES type that is a complex combination of hydrocarbons predominantly comprised of saturated hydrocarbons in the range of $C_{20}$ to $C_{50}$ obtained by (1) solvent extraction of heavy petroleum distillate; or (2) treating of heavy petroleum distillate with hydrogen in the presence of a catalyst; followed by solvent dewaxing. In one embodiment, the low PCA oil contains not more than 1 mg/kg of benzo(a)pyrene, and not more than 10 mg/kg total of the following polycyclic aromatic hydrocarbons: benzo(a)pyrene, benzo(e)pyrene, benzo(a)anthracene, benzo(b)fluoranthene, benzo(j)fluoranthene, benzo(k)fluoranthene, dibenzo(a,h)anthracene, and chrysene.

Suitable MES oils are available commercially as Catenex SNR from Shell, Prorex 15 and Flexon 683 from ExxonMobil, VivaTec 200 from BP, Plaxolene MS from TotalFinaElf, Tudalen 4160/4225 from Dahleke, MES-H from Repsol, MES from Z8, and Olio MES S201 from Agip. Suitable TDAE oils are available as Tyrex 20 from ExxonMobil, VivaTec 500, VivaTec 180 and Enerthene 1849 from BP, and Extensoil 1996 from Repsol. Suitable heavy naphthenic oils are available as Shellflex 794, Ergon Black Oil C1, Ergon Black Oil C2, Ergon H2000, Cross C2000, Cross C2400, and San Joaquin 2000L. Suitable SRAE oil includes NC 140 from Japan Energy Corp. The oils may be available as the oil alone or along with an elastomer in the form of an extended elastomer.

The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition", "compounded rubber" and "rubber compound" are used interchangeably to refer to rubber which has been blended or mixed with various ingredients and materials, and such terms are well known to those having skill in the rubber mixing or rubber compounding art.

The vulcanizable rubber composition may include from about 10 to about 150 phr of silica that has not been prehydrophobated with fluorinated silane.

The commonly employed siliceous pigments which may be used in the rubber compound include conventional pyrogenic and precipitated siliceous pigments (silica). In one embodiment, precipitated silica is used. The conventional siliceous pigments employed in this invention are precipitated silicas such as, for example, those obtained by the acidification of a soluble silicate, e.g., sodium silicate.

Such conventional silicas might be characterized, for example, by having a BET surface area, as measured using nitrogen gas. In one embodiment, the BET surface area may be in the range of about 40 to about 600 square meters per gram. In another embodiment, the BET surface area may be in a range of about 80 to about 300 square meters per gram. The BET method of measuring surface area is described in the *Journal of the American Chemical Society,* Volume 60, Page 304 (1930).

The conventional silica may also be characterized by having a dibutylphthalate (DBP) absorption value in a range of about 100 to about 400, alternatively about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhodia, with, for example, designations of Z1165MP and Z165GR and silicas available from Degussa AG with, for example, designations VN2 and VN3, etc.

The vulcanizable rubber composition may include from 1 to 100 phr of carbon black, crosslinked particulate polymer gel, ultra high molecular weight polyethylene (UHMWPE) or plasticized starch.

Commonly employed carbon blacks can be used as a conventional filler. Representative examples of such carbon blacks include N110, N121, N134, N220, N231, N234, N242, N293, N299, N315, N326, N330, M332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145. g/kg and DBP number ranging from 34 to 150 cm$^3$/100 g.

Other fillers may be used in the rubber composition including, but not limited to, particulate fillers including ultra high molecular weight polyethylene (UHMWPE), particulate polymer gels including but not limited to those disclosed in U.S. Pat. Nos. 6,242,534; 6,207,757; 6,133,364; 6,372,857; 5,395,891; or 6,127,488, and plasticized starch composite filler including but not limited to that disclosed in U.S. Pat. No. 5,672,639.

In one embodiment the rubber composition for use in the tire tread may contain a conventional sulfur containing organosilicon compound. Examples of suitable sulfur containing organosilicon compounds are of the formula:

$$Z\text{-Alk-}S_n\text{-Alk-}Z \quad \text{II}$$

in which Z is selected from the group consisting of $$-\underset{\underset{R^7}{|}}{\overset{\overset{R^6}{|}}{Si}}-R^6, \quad -\underset{\underset{R^7}{|}}{\overset{\overset{R^6}{|}}{Si}}-R^7 \quad \text{and} \quad -\underset{\underset{R^7}{|}}{\overset{\overset{R^7}{|}}{Si}}-R$$

where R$^6$ is an alkyl group of 1 to 4 carbon atoms, cyclohexyl or phenyl; R$^7$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl)disulfide, 3,3'-bis(triethoxysilylpropyl)disulfide, 3,3'-bis(triethoxysilylpropyl)tetrasulfide, 3,3'-bis(triethoxysilylpropyl)octasulfide, 3,3'-bis(trimethoxysilylpropyl)tetrasulfide, 2,2'-bis(triethoxysilylethyl)tetrasulfide, 3,3'-bis(trimethoxysilylpropyl)trisulfide, 3,3'-bis(triethoxysilylpropyl)trisulfide, 3,3'-bis(tributoxysilylpropyl)disulfide, 3,3'-bis(trimethoxysilylpropyl)hexasulfide, 3,3'-bis(trimethoxysilylpropyl)octasulfide, 3,3'-bis(trioctoxysilylpropyl)tetrasulfide, 3,3'-bis(trihexoxysilylpropyl)disulfide, 3,3'-bis(tri-2"-ethylhexoxysilylpropyl)trisulfide, 3,3'-bis(triisooctoxysilylpropyl)tetrasulfide, 3,3'-bis(tri-t-butoxysilylpropyl)disulfide, 2,2'-bis(methoxy diethoxy silyl ethyl)tetrasulfide, 2,2'-bis(tripropoxysilylethyl)pentasulfide, 3,3'-bis(tricyclonexoxysilylpropyl)tetrasulfide, 3,3'-bis(tricyclopentoxysilylpropyl)trisulfide, 2,2'-bis(tri-2"-methylcyclohexoxysilylethyl)tetrasulfide, bis(trimethoxysilylmethyl)tetrasulfide, 3-methoxy ethoxy propoxysilyl 3'-diethoxybutoxy-silylpropyltetrasulfide, 2,2'-bis(dimethyl methoxysilylethyl)disulfide, 2,2'-bis(dimethyl sec.butoxysilylethyl)trisulfide, 3,3'-bis(methyl butylethoxysilylpropyl)tetrasulfide, 3,3'-bis(di t-butylmethoxysilylpropyl)tetrasulfide, 2,2'-bis(phenyl methyl methoxysilylethyl)trisulfide, 3,3'-bis(diphenyl isopropoxysilylpropyl)tetrasulfide, 3,3'-bis(diphenyl cyclohexoxysilylpropyl)disulfide, 3,3'-bis(dimethyl ethylmercaptosilylpropyl)tetrasulfide, 2,2'-bis(methyl dimethoxysilylethyl)trisulfide, 2,2'-bis(methyl ethoxypropoxysilylethyl)tetrasulfide, 3,3'-bis(diethyl methoxysilylpropyl)tetrasulfide, 3,3'-bis(ethyl di-sec.butoxysilylpropyl)disulfide, 3,3'-bis(propyl diethoxysilylpropyl)disulfide, 3,3'-bis(butyl dimethoxysilylpropyl)trisulfide, 3,3'-bis(phenyl dimethoxysilylpropyl)tetrasulfide, 3-phenyl ethoxybutoxysilyl 3'-trimethoxysilylpropyl tetrasulfide, 4,4'-bis(trimethoxysilylbutyl)tetrasulfide, 6,6'-bis(triethoxysilylhexyl)tetrasulfide, 12,12'-bis(triisopropoxysilyl dodecyl)disulfide, 18,18'-bis(trimethoxysilyloctadecyl)tetrasulfide, 18,18'-bis(tripropoxysilyloctadecenyl)tetrasulfide, 4,4'-bis(trimethoxysilyl-buten-2-yl)tetrasulfide, 4,4'-bis(trimethoxysilylcyclohexylene)tetrasulfide, 5,5'-bis(dimethoxymethylsilylpentyl)trisulfide, 3,3'-bis(trimethoxysilyl-2-methylpropyl)tetrasulfide, 3,3'-bis(dimethoxyphenylsilyl-2-methylpropyl)disulfide.

In one embodiment, the sulfur containing organosilicon compounds are the 3,3'-bis(trimethoxy or triethoxy silylpropyl)sulfides. In one embodiment, the sulfur containing organosilicon compounds are 3,3'-bis(triethoxysilylpropyl)disulfide and 3,3'-bis(triethoxysilylpropyl)tetrasulfide. Therefore, as to formula II, Z may be

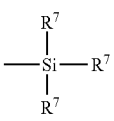

where R$^7$ is an alkoxy of 2 to 4 carbon atoms, alternatively 2 carbon atoms; alk is a divalent hydrocarbon of 2 to 4 carbon atoms, alternatively with 3 carbon atoms; and n is an integer of from 2 to 5, alternatively 2 or 4.

In another embodiment, suitable sulfur containing organosilicon compounds include compounds disclosed in U.S. Pat. No. 6,608,125. As disclosed in U.S. Pat. No. 6,608,125, these sulfur containing organosilicon compounds are of the formula G-C(=O)—S—CH$_2$CH$_2$CH$_2$SiX$_3$ wherein each X is an independently selected RO— group wherein each R is independently selected from the group consisting of hydrogen, alkyl that may or may not contain unsaturation, alkenyl groups, aryl groups, and aralkyl groups, such moieties other than hydrogen having from 1 to 18 carbon atoms, and G is a monovalent alkyl of from 6 to 8 carbon atoms. In one embodiment, the sulfur containing organosilicon compounds includes 3-(octanoylthio)-1-propyltriethoxysilane, $CH_3(CH_2)_6C(=O)-S-CH_2CH_2CH_2Si(OCH_2CH_3)_3$, which is available commercially as NXT™ from GE Silicones.

In another embodiment, suitable sulfur containing organosilicon compounds include those disclosed in U.S. Patent Publication 2003/0130535. As disclosed in U.S. Patent Publication 2003/0130535, these sulfur containing organosilicon compounds are of the formulas III or IV

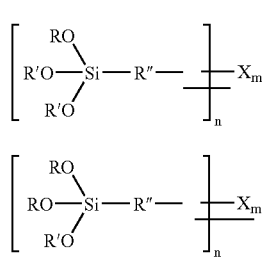

wherein: R is a methyl or ethyl group;

R' is identical or different and is a $C_9C_{30}$ branched or unbranched monovalent alkyl or alkenyl group, aryl group, aralkyl group, branched or unbranched $C_2$-$C_{30}$ alkyl ether group, branched or unbranched $C_2$-$C_{30}$ alkyl polyether group or R'''$_3$Si, where R''' is $C_1$-$C_{30}$ branched or unbranched alkyl or alkenyl group, aralkyl group or aryl group, R" is a branched or unbranched, saturated or unsaturated, aliphatic, aromatic or mixed aliphatic/aromatic divalent $C_1$-$C_{30}$ hydrocarbon group; X is SH where n=1 and m=1, S where n=2 and m=1-10 and mixtures thereof, S(C=O)—R''' where n=1 and m=1 or H where n=1 and m=1;

R" may mean $CH_2$, $CH_2CH_2$, $CH_2CH_2CH_2$, $CH_2CH_2CH_2CH_2$, $CH(CH_3)$, $CH_2CH(CH_3)$, $C(CH_3)_2$, $CH(C_2H_5)$, $CH_2CH_2CH(CH_3)$, $CH_2CH(CH_3)CH_2$ or

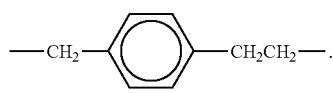

In one embodiment, the sulfur containing organosilicon compound is of formula III, R is ethyl, R' is $C_{12}$-$C_{14}$ alkyl, R" is $CH_2CH_2CH_2$, X is SH, n is 1 and m is 1. In one embodiment, the sulfur containing organosilicon compound is Si-363 from Degussa.

The amount of the sulfur containing organosilicon compound in a rubber composition will vary depending on the level of other additives that are used. Generally speaking, the amount of the compound will range from 0.5 to 20 phr. In one embodiment, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of tackifier resins, if used, comprise about 0.5 to about 10 phr, usually about 1 to about 5 phr. Typical amounts of processing aids comprise about 1 to about 50 phr. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

The rubber composition may be incorporated in a variety of rubber components of the tire. For example, the rubber component may be a tread (including tread cap and tread base), sidewall, apex, chafer, sidewall insert, wirecoat or innerliner. In one embodiment, the compound is a tread.

The pneumatic tire of the present invention may be a race tire, passenger tire, aircraft tire, agricultural, earthmover, off-the-road, truck tire, and the like. In one embodiment, the tire is a passenger or truck tire. The tire may also be a radial or bias.

Vulcanization of the pneumatic tire of the present invention is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire comprising at least one component comprising a rubber composition comprising at least one diene based elastomer and a precipitated silica that prior to mixing with said elastomer is prehydrophobated with a fluorinated silane of the following formula:

$$R_f\text{—}R^1\text{—}SiX_{3-x}\text{—}R^2{}_x \qquad \text{I}$$

wherein $R_f$ is a perfluorinated group optionally containing one or more heteroatoms; $R^1$ is a divalent alkylene group, arylene group or mixture thereof, substituted with one or more heteroatoms or functional groups, containing about 1 to about 16 carbon atoms; $R^2$ is a lower alkyl group; X is a halide, a lower alkoxy group or an acyloxy group; and x is 0 or 1; and the composition further comprising a silica that is not prehydrophobated with a fluorinated silane, and a sulfur containing organosilicon compound.

2. The pneumatic tire of claim 1 wherein $R^1$ contains from 3 to 10 carbon atoms.

3. The pneumatic tire of claim 1 wherein $R^2$ is a methyl group.

4. The pneumatic tire of claim 1 wherein X is a methoxy or ethoxy group.

5. The pneumatic tire of claim 1 wherein X is —OC(O)$R^3$ wherein $R^3$ is a ($C_1$-$C_4$) alkyl group.

6. The pneumatic tire of claim 1 wherein x is 0.

7. The pneumatic tire of claim 1 wherein X is a halide.

8. The pneumatic tire of claim 1 wherein X is chloride.

9. The pneumatic tire of claim 1 wherein the fluorinated silane is selected from the group consisting of $C_7F_{15}CH_2OCH_2CH_2CH_2SiCl_3$; $C_7F_{15}CH_2OCH_2CH_2CH_2Si(CH_3)Cl_2$; $C_7F_{15}CH_2OCH_2CH_2CH_2SiCl(OCH_3)_2$; $C_7F_{15}CH_2OCH_2CH_2CH_2SiCl_2(OC_2H_5)$; $C_8F_{17}SO_2N(Et)CH_2CH_2CH_2SiCl_3$; $C_8F_{17}SO_2N(Me)CH_2CH_2CH_2Si(CH_3)Cl_2$; and $C_7F_{15}CH_2OCH_2CH_2CH_2Si(OAc)_3$ and mixtures thereof.

10. The pneumatic tire of claim 1, wherein from 10 to 100 parts by weight, per 100 parts by weight of said elastomer, of said prehydrophobated silica is present in said rubber composition.

11. The pneumatic tire of claim 1, wherein said rubber composition further comprises from 10 to 100 parts by weight, per 100 parts by weight of said elastomer, of a silica that is not prehydrophobated with a fluorinated silane.

12. The pneumatic tire of claim 1, wherein the sulfur containing organosilicon compound is of the formula II $$Z\text{-Alk-}S_n\text{-Alk-}Z \qquad \text{II}$$

in which Z is selected from the group consisting of

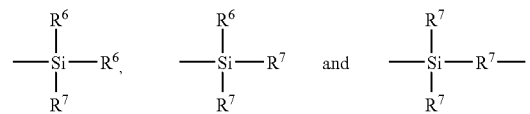

where $R^6$ is an alkyl group of 1 to 4 carbon atoms, cyclohexyl or phenyl; $R^7$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

13. The pneumatic tire of claim 1, wherein the sulfur containing organosilicon compound is 3-(octanoylthio)-1-propyltriethoxysilane.

14. The pneumatic tire of claim 1, wherein the sulfur containing organosilicon compound comprises at least one of 3,3'-bis(triethoxysilylpropyl) disulfide and 3,3'-bis(triethoxysilylpropyl) tetrasulfide.

* * * * *